ns Patented July 8, 1958

2,842,316
REGISTER RESETTING MECHANISM

Edouard Schubauer, Geneva, Switzerland, assignor to Sodeco, Societe des Compteurs de Geneve, Geneva, Switzerland, a firm Application August 22, 1955, Serial No. 529,654

Claims priority, application Switzerland August 25, 1954

6 Claims. (Cl. 235—144)

My invention has for its object a register resetting mechanism for metering wheels provided with return-to-zero cams and incorporating disconnectable driving pinions; my improved register resetting mechanism is characterized by the fact that the metering wheels contained therein are held fast in their zero position when they have returned into it, until the driving pinions have reengaged the corresponding metering wheels.

This mechanism prevents the shifting of the metering wheels, after they have returned to zero, up to the moment of their reengagement with the driving pinions and this prevents any possible unwanted shifting of the said wheels, or, in fact, a locking of the meter. Such movements of the loose metering wheels may be produced e. g. by vibrations such as those which appear in the operation of the magnet armature, chiefly in the case where the metering wheels are not sufficiently well balanced.

Fig. 1 is a diagrammatic showing of a metering system provided with return-to-zero heart-shaped cams controlling the metering wheels, the register resetting mechanism becoming operative only when hand operation has reached its end.

Fig. 2 is a perspective view of a simple form of a meter with return-to-zero heart-shaped cams controlling the metering wheels and with auxiliary stopping means for the said wheels.

Figure 1:
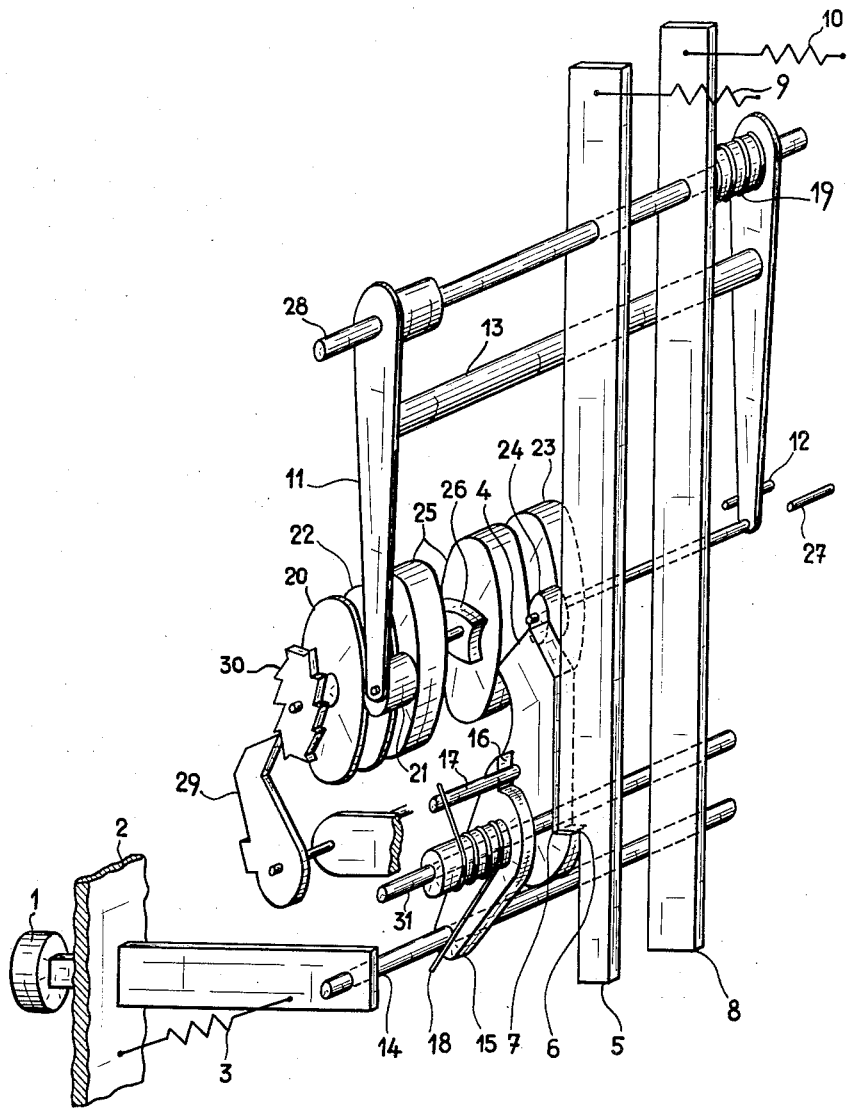
Figs. 1 and 2 are illustrations of such mechanisms, and in particular.

The return-to-zero is performed as follows in the mechanism illustrated in Fig. 1.

When the mechanism is inoperative, the pusher knob 1 engages the front plate 2 under the action of the spring 3. The return-to-zero lever 4 is held in position by the releasing lever 5 carrying a projection engaging a notch 7 in the said return-to-zero lever 4. The releasing lever 5 and the lever 8 controlling the pinion carrying frame 11 are urged into their inoperative positions by the springs 9 and 10 respectively. This inoperative position is defined by a pin 12 against which the pinion-carrying frame 11 bears when the control lever 8 engages the crossmember 13 on said pinion-carrying frame 11. The releasing lever 5, the control lever 8 and the pinion-carrying frame 11 are revolubly mounted on a common spindle 28, while the control lever 8 is drivingly connected through a frictional connection 19 with the pinion-carrying frame 11. 29 designates a driving catch adapted to engage the ratchet wheel 30 rigid with a toothed wheel 20 while the first pinion 21 is adapted to transfer the movements of the driving catch to the teeth 22 of the first metering wheel 23. 24 designates further driving pinions and 25 the metering wheels associated with the return-to-zero heart-shaped cams 26.

When it is desired to return the metering wheels into their starting or zero positions, the pusher knob 1 is depressed so that its rectilinear motion is transferred through the spindle 14 to the lever 15 pivotally mounted on the spindle 31. The rocking of the said lever 15 tensions a spring 18 one end of which rests on the stud 17 secured to the return-to-zero lever 4. As the said lever 15 continues rocking the control lever 8 and, a short time afterwards, the releasing lever 5, are rocked. The lever 8 drives first through the friction coupling 19 the pinion-carrying frame until the latter abuts against the stop 27 so that the driving pinions 21 and 24 disengage respectively the toothed wheel 20 and the teeth 22 on the metering wheels 25. The lever 8 continues then moving alone and is followed only by the releasing lever 5 which is shifted as far as the point for which its engagement with the return-to-zero lever 4 is cut off. The tensioned spring 18 urges now the return-to-zero lever 4 against the heart-shaped cams 26 controlling the metering wheels and urges the latter into their starting positions. The angular shifting of the return-to-zero lever 4 is smaller than that of the pivoting lever 15 to an extent such that the difference between their angular movements allows, when the pusher knob 1 returns into its starting position, the pinion-carrying frame 11 to return first into contact with the stop 12 as provided through the friction coupling 19 by the control lever urged by the spring 10 to also execute a return movement. In other words, the driving pinions 21 and 24 return into engagement with the teeth on the corresponding metering wheels before the nose 16 on the pivoting lever 15 returning towards its starting position reengages the stud or stop 17 on the return-to-zero lever 4, returns thus the latter into its position of reengagement with the releasing lever 5. The tensioning of the spring 18 should be large enough for it to return reliably the metering wheels into their starting positions when the pivoting lever 15 has reached its terminal position; on the other hand, a sufficient pressure should be exerted by the return-to-zero lever on the heart-shaped cams of the metering wheels, the said pressure prevailing until the pivoting lever 15 has returned into a position for which it shifts back again the return-to-zero lever.

Figure 2:
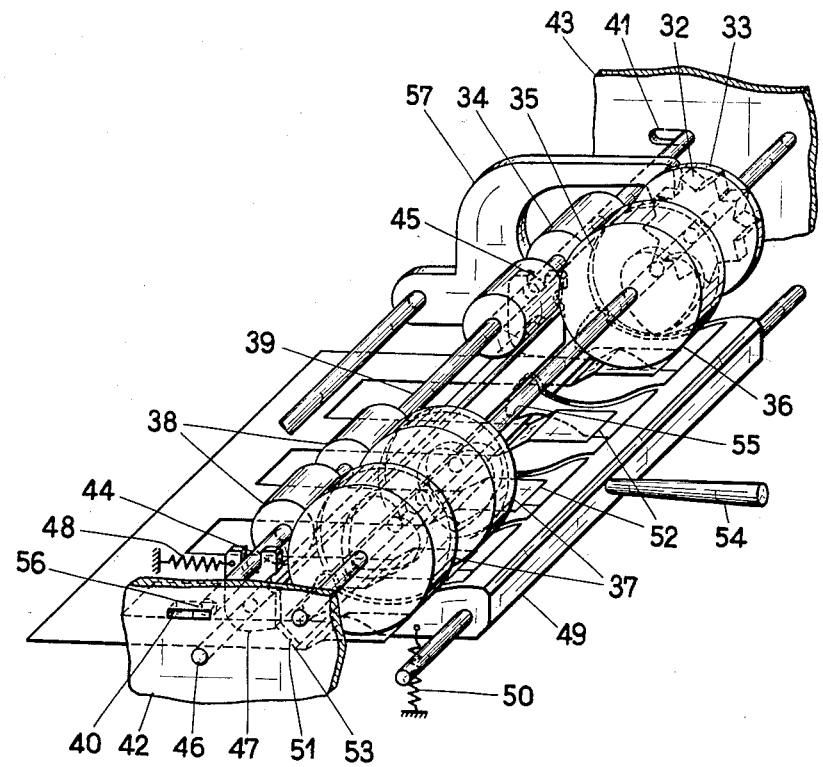

The return-to-zero arrangement according to Fig. 2 is simpler. It operates simultaneously with the hand-operated control performed e. g. through a return-to-zero lever. In the arrangement illustrated, the control is provided by an escapement 57 which acts on a toothed wheel 33 carrying a star-shaped member 32, and each impulse is transferred thence through a pinion 34 onto the teeth 35 of the first metering wheel 36. The nature of this drive is irrelevant. It is possible to resort as well to a ratchet wheel control system. The further metering wheels 37 are driven in the usual manner through the intermediate driving pinions 38. The pinions 34 and the driving pinions 38 are mounted on the spindle 39 which is carried in two slots 40 and 41 formed in the plates 42 and 43 so that it is shiftable in a radial direction towards and away from the axis of the metering wheels. This spindle 39 is, furthermore, guided in two notches 44 and 45 of a rocker 47 carried revolubly at 46. The spring 48 will make the rocker 47 pivot so that it draws the driving pinions away from the metering wheels. On the other hand, the return-to-zero lever 49 subjected to the action of the spring 50 engages the shaped member 51 on the rocker 47 and allows the pinions to mesh with the corresponding metering wheels. Each metering wheel is further associated with a spring blade 52 fixed at one end and serving as means for holding the said metering wheels in position, and the said blades are urged during operation away from the metering wheels through the flange 53 of the rail 51 rigid with the rocker.

When it is desired to return the metering wheels to zero, the operator has only to depress the lever 54. The return-to-zero lever 49 is thus rocked against the pressure of the spring 50 and relieves first the rocker 47 which turns now under the action of the spring 48. This shifts the different pinions 34 and 38 out of engagement and the flange 53 of the shaped member 51 releases the spring blades 52 which reengage the metering wheels through their own elasticity.

The lever 54 being released, the spring 50 returns the return-to-zero lever 49 back into its inoperative position. The projections 55 of the return-to-zero lever 49 bear against the shaped member 51 on the rocker 47 until the pinions 34 and 38 have again reengaged the corresponding metering wheels. It is only at the last moment that the flange 53 moves the spring blades 52 away from the metering wheels.

The rectilinear shifting of the pinions is advantageous in so far as the intervals between successive teeth on the metering rollers are always positioned in readiness for the reintroduction of the pinion teeth. If the pinions were shifted away through rotation round the spindle 46 for instance, the possibility of an objectionable engagement between the teeth on the two parts would be much greater.

A further advantage is provided by the fact that at least one end of the spindle carrying the pinions is cut flat, as shown at 56 in Fig. 2. This shaping prevents any rocking of the pinion-carrying spindle during the engagement and disengagement movements.

What I claim is:

1. A register resetting mechanism for a metering system including coaxial metering wheels, return-to-zero cams cooperating with the said wheels and a plurality of pinions controlling each the corresponding metering wheel, the said mechanism including a pusher knob, a lever adapted to pivot through a predetermined angle upon depression of the said knob, a control lever moving in unison with the said pivoting lever and controlling the engagement and disengagement of the pinions with the metering wheels, a spring tensioned by the said pivoting lever when angularly shifted through operation of the knob, a lever controlling the return-to-zero cams and subjected to the action of the said spring, a releasing lever holding last mentioned lever in its inoperative position and controlled by the pusher knob when the latter has, upon depression, almost reached its end position, to release then the said return-to-zero cam-controlling lever, the angular path followed by the latter being substantially smaller than that followed by the pivoting lever to provide for engagement of the return-to-zero cams through the lever controlling them until reengagement of the pinions with the corresponding metering wheels under the action of the control lever.

2. A register resetting mechanism for a metering system including coaxial metering wheels, return-to-zero cams cooperating with the said wheels and a plurality of pinions controlling each the corresponding metering wheel, the said mechanism including a pusher knob, a lever adapted to pivot through a predetermined angle upon depression of the said knob, a spring tensioned by the said pivoting lever when angularly shifted through operation of the knob, a lever controlling the return-to-zero cams and subjected to the action of the said spring, a pivoting control lever, two stops limiting the pivotal movement of the said control lever, a pinion-carrying frame, a friction coupling between the said frame and the said control lever, means wherethrough the depression of the pusher knob urges the control lever in a predetermined direction until the said lever abuts against one of the stops, and simultaneously shifts the frame into a position disengaging the pinions from the cooperating metering wheels, a releasing lever also controlled by the depression of the pusher knob, and engaging the lever controlling the return-to-zero cams to release same when the said releasing lever has been shifted through a predetermined angle, a spring urging the said control lever back into engagement with the second stop upon release of the pusher knob, the return movement of the said control lever urging the pinion-carrying frame back into the position reengaging the pinions with the metering wheels and means urging the pusher knob, when released, together with the first mentioned pivoting lever, back into their starting positions and a projection on the first mentioned pivoting lever engaging the lever controlling the cams to return said cam-controlling lever back into its inoperative position, the location of the said projection being such as will provide for this return movement only after reengagement of the pinions with the metering wheels.

3. A register resetting mechanism for a metering system including coaxial metering wheels, return-to-zero cams cooperating with the said wheels and a plurality of pinions controlling each the corresponding metering wheel, the said mechanism including means for shifting the pinions bodily into and out of engagement with the cooperating metering wheels, means controlling the cams to produce the return to zero of the metering wheels after release by the corresponding pinions, blade springs adapted to engage and hold against rotation the metering wheels, means wherethrough the pinion-shifting means release the said springs for engagement of the latter with the said wheels simultaneously with the disengagement of the pinions with reference to the said wheels and urge them away from the metering wheels, after operation of the return-to-zero cams, only upon full engagement of the pinions with the metering wheels.

4. A register resetting mechanism for a metering system including coaxial metering wheels, return-to-zero cams cooperating with the said wheels, and a plurality of pinions controlling each the corresponding metering wheel, the said mechanism including means for shifting the pinions bodily into and out of engagement with the cooperating metering wheels, means controlling the cams to produce the return to zero of the metering wheels after release by the corresponding pinions, blade springs adapted to engage and hold against rotation the metering wheels, two parallel spindles carrying respectively the metering wheels and the controlling pinions, an angularly shiftable rocker adapted to pivot round an axis parallel with the said parallel spindles and including a longitudinal flange adapted, upon rocking of the rocker in a predetermined direction, to release the said blade springs to allow same to engage the corresponding metering wheels, the said rocker being provided with notches engaging the pinion-carrying spindle whereby the pivotal movement of the rocker in the said predetermined direction urges the pinion-carrying spindle away from the metering wheels to disengage the latter, and means urging the rocker back into its starting position to provide, after the return into zero-position and in succession, for the reengagement between the pinions and metering wheels and for the shifting of the blade springs away from the metering wheels.

5. A register resetting mechanism for a metering system including coaxial metering wheels, return-to-zero cams cooperating with the said wheels and a plurality of pinions controlling each the corresponding metering wheel, the said mechanism including means for shifting the pinions bodily into and out of engagement with the cooperating metering wheels, means controlling the cams to produce the return to zero of the metering wheels after release by the corresponding pinions, blade springs adapted to engage and hold against rotation the metering wheels, two parallel spindles carrying respectively the metering wheels and the controlling pinions, guiding means for the pinion-carrying spindle adapted to guide the latter in a radial plane with reference to the metering wheel spindle, an angularly shiftable rocker adapted to pivot round an axis parallel with the said parallel spindles and including a longitudinal flange adapted, upon rocking of the rocker in a predetermined direction, to release the said blade springs to allow same to engage the corresponding metering wheels, the said rocker being provided with radial notches engaging slidably the pinion-carrying spindle whereby the pivotal movement of the rocker in the said predetermined direction urges the pinion-carrying spindle, along its guiding means, away from the metering wheels to disengage the latter, and means urging the rocker back into its starting position to provide, after the return into zero-position and in succession, for the reengagement between the pinions and metering wheels and for the shifting of the blade springs away from the metering wheels.

6. A register resetting mechanism for a metering system including coaxial metering wheels, return-to-zero cams cooperating with the said wheels and a plurality of pinions controlling each the corresponding metering wheel, the said mechanism including means for shifting the pinions bodily into and out of engagement with the cooperating metering wheels, means controlling the cams to produce the return to zero of the metering wheels after release by the corresponding pinions, blade springs adapted to engage and hold against rotation the metering wheels, two parallel spindles carrying respectively the metering wheels and the controlling pinions, guiding means for the pinion-carrying spindle adapted to guide the latter in a radial plane with reference to the metering wheel spindle, means preventing the pinion-carrying spindle from rotating round its axis during its movement over its guiding means, an angularly shiftable rocker adapted to pivot round an axis parallel with the said parallel spindles and including a longitudinal flange adapted, upon rocking of the rocker in a predetermined direction, to release the said blade springs to allow same to engage the corresponding metering wheels, the said rocker being provided with radial notches engaging slidably the pinion-carrying spindle whereby the pivotal movement of the rocker in the said predetermined direction urges the pinion-carrying spindle, along its guiding means, away from the metering wheels to disengage the latter, and means urging the rocker back into its starting position to provide, after the return into zero-position and in succession, for the reengagement between the pinions and metering wheels and for the shifting of the blade springs away from the metering wheels.

References Cited in the file of this patent
UNITED STATES PATENTS

| | | |
|---|---|---|
| 545,034 | Balzer | Aug. 20, 1895 |
| 1,356,607 | Dixon | Oct. 26, 1920 |